Figure 3:
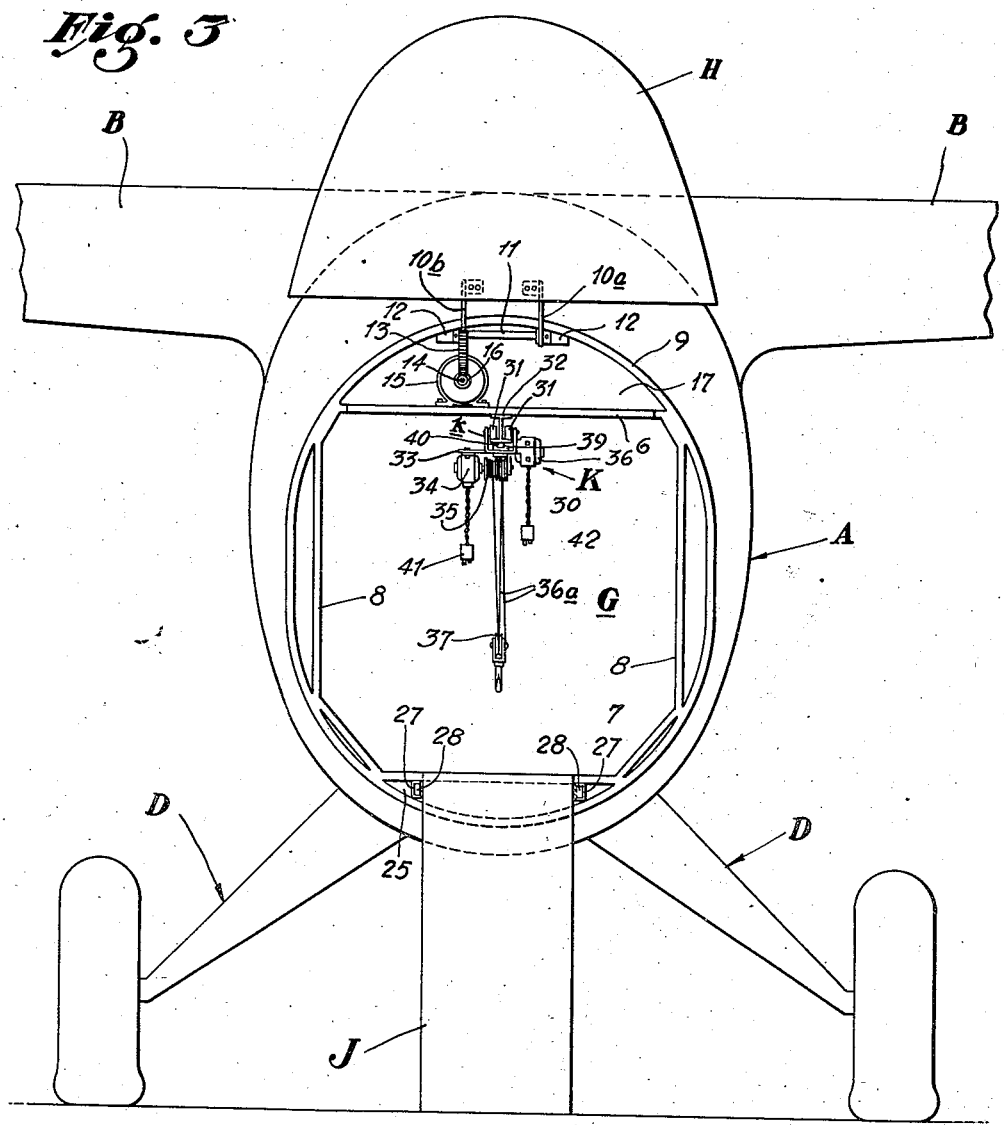

Dec. 30, 1941.    C. H. BABB ET AL    2,268,009
AIRCRAFT
Filed March 17, 1939    2 Sheets-Sheet 1
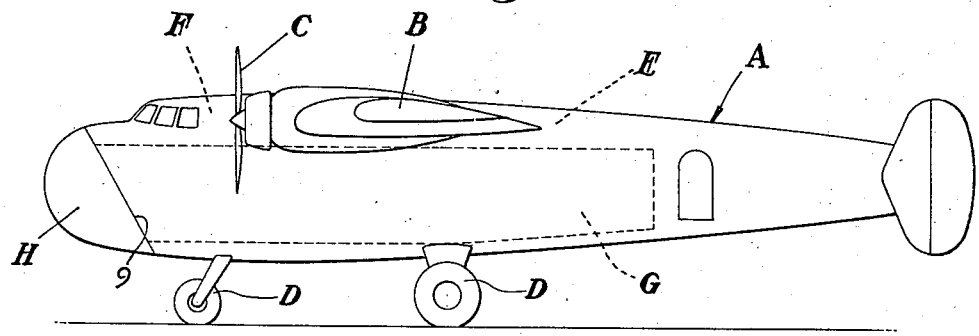
Fig. 1
Fig. 2
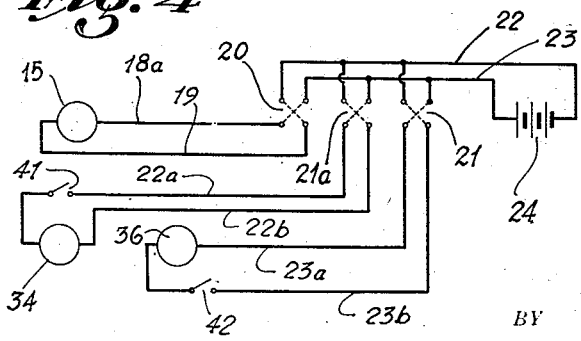
Fig. 4
CHARLES H. BABB and
JOSEF S. J. HLOBIL,
INVENTORS;
BY
ATTORNEY.

Dec. 30, 1941.  C. H. BABB ET AL  2,268,009
AIRCRAFT
Filed March 17, 1939  2 Sheets-Sheet 2

Charles H. Babb and
Josef S. J. Hlobil,
INVENTORS;

BY Raymond ?? Blakeslee,
ATTORNEY.

Patented Dec. 30, 1941

2,268,009

UNITED STATES PATENT OFFICE 2,268,009

AIRCRAFT

Charles H. Babb, Los Angeles, and Josef S. J. Hlobil, Beverly Hills, Calif., assignors to Charles H. Babb, Los Angeles, Calif.

Application March 17, 1939, Serial No. 262,434

3 Claims. (Cl. 244—118)

This invention relates to improvements in aircraft, and more particularly to flying machines having the usual fuselage, wings, landing gear, controls and power unit or units; and the invention more particularly concerns the utilization of a portion of the fuselage or body for purposes of transportation of load other than passenger load, and including freight of various types or devices, materials, supplies, and equipment pertaining to warfare, and even troops. The invention in further particularity relates to the provision and operation and control of means of access to such storage space, and, closing up or sealing of same for flight and ready opening up of same for purposes of reception or discharge of contents; and also relates to means for handling such contents expeditiously and conveniently and effectively, likewise provided with suitable control means in part or in whole.

Although it is present practice to stow away and carry in airplanes certain amount of baggage, luggage and other articles and objects, the present invention is concerned with the utilization of a major space in the airplane or a space having a major cross-sectional area, and also with the features pertaining to the rendering of same accessible, and the closing off of same during flight or when the storage and discharge thereof are not taking place.

With the above and other objects in view, the invention consists in the novel and useful provision, formation, construction, combination, association and interrelation of parts, members and features, all as hereinafter described, shown in the drawings, and finally pointed out in claims.

In the drawings:

Fig. 1 is a side elevation of a flying machine of conventional type;

Fig. 2 is an enlarged partial central longitudinal section thereof, disclosing a portion of the storage compartment which is indicated in Fig. 1 in dotted lines and disclosing the closure for said storage compartment which is shown open for receipt and discharge of contents by or from the compartment, same being shown in closed position in Fig. 1; and further adjuncts and operating means and control means being shown likewise in Fig. 2;

Fig. 3 is a front elevation upon a still further enlarged scale of the structure and means illustrated in Fig. 1; and Fig. 4 is a diagrammatical view of electric circuits which may be utilized in exercising controls for operative features shown in the other figures.

Corresponding parts in all the figures are designated by the same reference characters.

Referring with particularity to the drawings, we have shown at A generally the fuselage or body of an airplane provided with the usual supporting wings B, and with propellers C to be driven in any preferred manner; landing gear D being likewise provided.

The body or fuselage is shown as provided with an upper or passenger compartment E forward of which is pilot's compartment F, partitioned off from the compartment E as at 5. Beneath the passenger compartment and the pilot's compartment is a storage compartment G, closed at the top by transverse partition 6, and having a floor member 7 and side walls 8. It will be seen that this storage compartment ranges longitudinally of the fuselage or body A throughout a major portion of its length, and that its cross-sectional area approximates or approaches the cross-sectional area of the fuselage or body minus the compartments E and F; and it has a forward inclined opening or mouth 9 of transverse dimensions likewise, major in proportions, and normally closed and sealed by closure member H, which is mounted upon arms, one of which, 10a, is fixed to and carried by a shaft 11 mounted in bearings 12 at the top of and just inwardly of the marginal portion of the major opening 9, and the other of which, 10b, is fixed to a worm segment 13 in turn fixed to the shaft 11. There are operating means I provided for swinging the closure H in rotative movement of the shaft 11, and including a shaft 14 constituting an extension of the shaft of an electric motor 15, the shaft 14 being provided with a worm 16 meshing with the worm segment 13, the motor 15 being shown mounted within a small compartment 17 forwardly of the forward wall 18 of the pilot's compartment F, and having electrical lead wires 18 and 19 extending to a reversing switch 20 upon the instrument board 19a within the pilot's compartment. Other lead wires 22 and 23 extend from that reversing switch 20 and other reversing switches 21 and 21a to a battery or source of electrical energy 24, which may be suitably disposed within said compartment F. By manipulating the reversing switch 20, the motor may be operated either to swing the closure H into open or upper position, as shown in Fig. 2, or downwardly into the closed position as shown in Fig. 1. The arms 10a and 10b are connected with such closure at the rear and lower marginal portion thereof, and such closure is of suitably streamlined or curved formation so as to conform to the general conformation of the entire body or fuselage A, in symmetry and minimized resistance to passage through the air.

In order to provide for convenient emplacement and discharge of contents for the storage compartment G, we provide an adjustable ramp J which may be conveniently housed within a chamber 25 provided beneath the storage compartment G or between the flooring 7 thereof and the fuselage main body or belly thereof, at 26. To facilitate adjusting such ramp, we provide channel irons 27 disposed at opposite sides of said chamber 25, and facing each other, and these channel irons accommodate rollers 28 mounted at the sides and adjacent the inner end of the ramp J and adapted to traverse the channel irons, there being a portion of the ramp 28a inward of the rollers 28 which is adapted to abut against the end of the floor member 7, as at 29, when the ramp is in lowered position or position of outward inclination, and which is first entered into the chamber 25 on chambering the ramp, which may be of any suitable metallic or other material. Hoist means K are provided for handling objects and materials in the storage and discharge of the same with respect to the compartment G, and the same may include a conveyor k shown as including a body member 30 of general channel cross-sectional formation within which are mounted traction rollers 31 in spaced pairs, the members of which are opposed to each other and rest upon the lower limb of a T-rail 32 secured to the top wall 6 of the compartment G and ranging longitudinally thereof, so that the conveyor k can travel from end to end of said compartment and the hoist means thus serve any portion of the latter. Depending from a bracket 33 carried at one side of the body member 30 is an electric motor 34, an extension of the shaft of which beneath the T-rail 32 is provided with a drum 35 upon which may be wound rope or cable 36a for operating upon and supporting a pulley 37 from which may be suspended a load 38. Supported by one side of the body member 30 is a further electric motor 36, an extension of the shaft of which is provided with a pinion 39 which meshes with and beneath a toothed rack 40 upon and extending lengthwise of the T-rail 32, and these motors 34 and 36 are both served by the lead wires 22a and 22b and 23a and 23b, in pairs, in parallel connection with the battery 24, and extending through lead wires 22 and 23 to the reversing switches 21 and 21a. In other words, all of the motors 15, 34 and 36 are served by the same electrical source 24 with which they are connected in parallel, and are respectively controlled by operation of the reversing switches 20, 21 and 21a. Said motors have respectively pendant switches 41 and 42 controlling the energization thereof, so that the conveyor k may be motored lengthwise of the T-rail under control of the motor 36 and its reversing switch 21, and, at any desired point, the hoist means K may be operated by the motor 34 controlled by its reversing switch 21 to elevate or lower various kinds of load in the charging or discharging of the compartment G.

The ramp J may be handled in any suitable manner, and it will be readily apparent that with control of the closure H by the reversing switch 20 and the control of both motors 34 and 36 by the reversing switches 21 and 21a and also by the immediate switches 41 and 42, the opening up or closing off of the compartment G may be taken care of from the pilot's compartment F, as well as control of the conditions pertaining to receipt or discharge of the load. As also follows, operation of the closure H to move the same into either opening or closing direction, and operation of the conveyor k in either direction and of the hoist means K and its pulley 37 either up or down, are all effected jointly from the pilot's compartment, and on signals to be given from those in charge of operations at loading and unloading, which latter persons throw the hoist means into or out of operation entirely by use of the pendant switches 41 and 42.

It is obvious, of course, that the nature of the controls in the respects mentioned may be widely varied for required or desired purposes, and the various aspects of control with respect to the closure and the hoist and its conveyor and the operation thereof may be divided up or altered or varied in accordance with choice or requirements.

The operation, method and use and advantages of the improvements in aircraft heretofore described and shown in the drawings will be readily understood from the foregoing description, taken in connection with said drawings, and with the following statement:

The airplane normally presents to the atmosphere a forward end portion of conventional or desired conformation, without any obstruction incident to its capability of being thrown open for handling of load or cargo. The closure H of the storage compartment G may readily be thrown into open position so that the hoist means K may be utilized, both in traveling lengthwise of the compartment G and in raising and lowering load, which also may be passed into the compartment over the ramp J, as may be possible or desirable. In handling certain classes of load, the ramp may be maintained chambered within the compartment 25 and the storage or discharge carried on independently thereof. The provision of this storage compartment G of major proportions makes quite desirable the provision of such hoist means K for handling the large loads which said chamber is capable of accommodating, and we are entirely unaware of the provision by others of any such storage chamber with any means for handling load therefor. It will be noticed that the storage compartment G is so disposed in the fuselage or body of the airplane that the weight of its load is so correspondingly disposed that it lends itself to proper stability of the airplane in flight, it being in the main directly beneath the sustaining wing surfaces plane.

The inclination of the opening provides an overhang or receding top portion, as desired, for facilitating loading and unloading.

It is, furthermore, obvious that many and various changes and alterations and modifications and substitutions and variances may be made in adapting the invention to varying conditions of use, practice, operation and service, without departing from the true spirit of the invention.

Having thus disclosed our invention, we claim and desire to secure by Letters Patent:

1. In an airplane, a fuselage being divided by a horizontal partition extending transversely of said fuselage parallel to its horizontal longitudinal median plane from a point relatively high in its nose and dividing the interior of said fuselage into an upper passenger compartment and a lower storage compartment, the forward end of said passenger compartment being arranged as a pilot cabin, said fuselage being severed into a closure forming nose portion and a body portion by a plane extending from an upper peripheral point forward of said pilot cabin and inclining rearwardly at a substantial angle with the longitudinal horizontal median plane of said fuselage, a shaft extending horizontally and transversely of the body of said fuselage and supported in bearings attached to the top part of said body inwardly of the plane of severance which forms the nose portion, hinge means connected at one end to the inner top edge of the nose and connected at its other end to said shaft, said means including a motion transmitting element, and motive means carried on said body portion and engaging said motion transmitting element for operating said hinge means to swing said nose portion relative to said body portion.

2. An airplane according to claim 1, said fuselage further comprising an auxiliary motor compartment positioned between said pilot cabin and the top point of said severing plane, said motive means comprising an electric motor positioned in said auxiliary motor compartment, and means for supplying electrical energy to said motor.

3. An airplane according to claim 1, said fuselage having an auxiliary horizontal transverse partition below said first named partition and being adjacent the bottom of said fuselage and constituting the floor of said storage compartment, a flat ramp member, means positioned in the space between said auxiliary partition and the bottom of said fuselage for slidably mounting said ramp therein, said severing plane intersecting said auxiliary partition and extending to a point therebelow in the bottom of said fuselage providing a ramp egress space therebetween, and said nose portion being adapted in the closed position to close said ramp egress space.

CHARLES H. BABB.
JOSEF S. J. HLOBIL.